Nov. 23, 1943.　　　　J. W. DUHN　　　　2,334,866
HEATER
Filed March 1, 1941　　　　2 Sheets-Sheet 1

INVENTOR
Jens William Duhn.
BY
Harness, Lind, Patee & Harris
ATTORNEYS.

Nov. 23, 1943.    J. W. DUHN    2,334,866
HEATER
Filed March 1, 1941    2 Sheets-Sheet 2
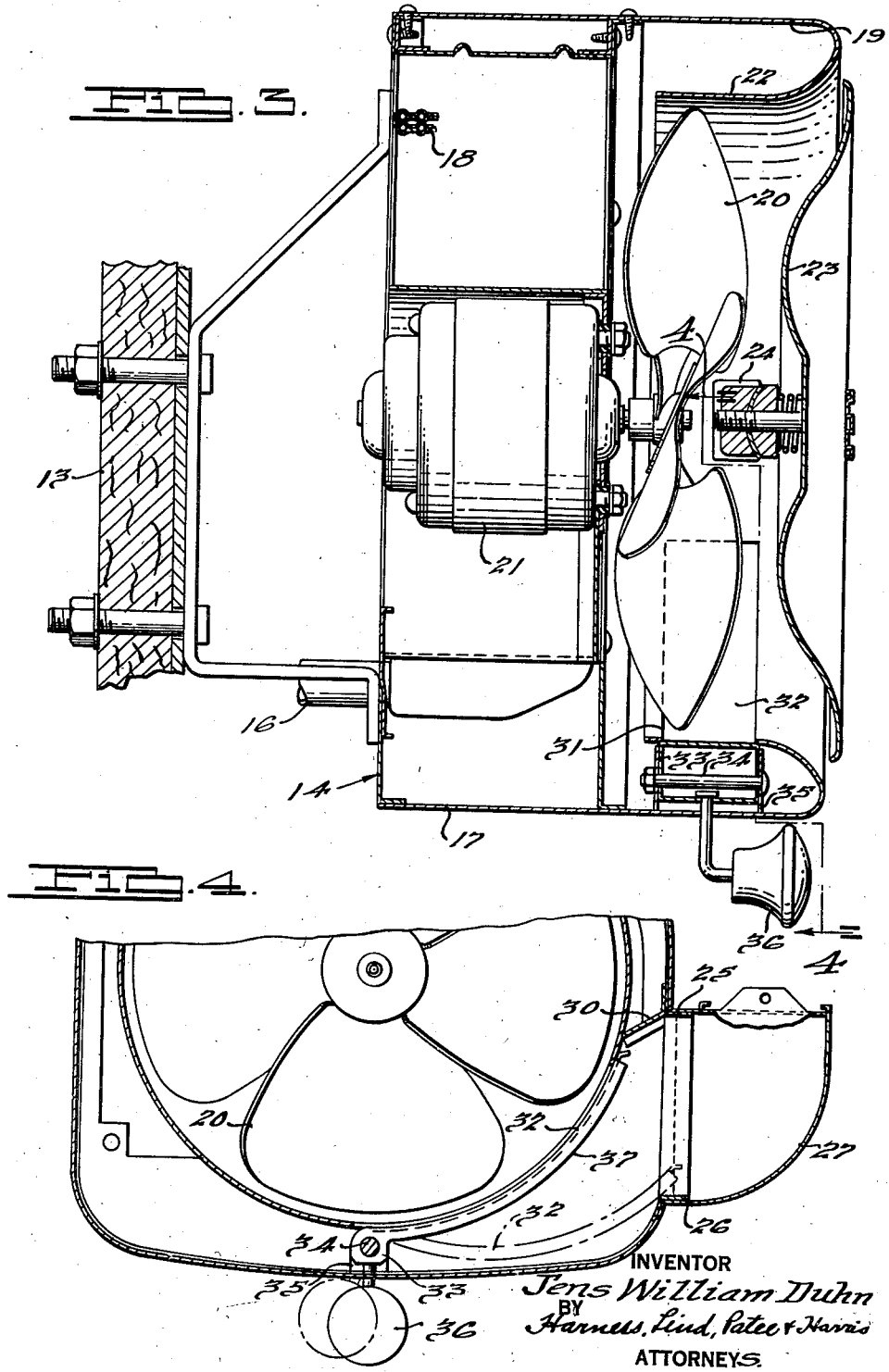
INVENTOR
Jens William Duhn
BY
Harness, Dind, Patec & Harris
ATTORNEYS.

Patented Nov. 23, 1943

2,334,866

UNITED STATES PATENT OFFICE 2,334,866

HEATER

Jens William Duhn, Pleasant Ridge, Mich., assignor to Chrysler Corporation, Highland Park, Mich., a corporation of Delaware Application March 1, 1941, Serial No. 381,245

8 Claims. (Cl. 98—2)

This invention relates to improvements in heaters and more particularly to an improved heater of the hot air type especially adapted for use in heating systems for motor vehicles.

It is desirable in motor vehicles to supply heat not only to the passenger compartment but to direct the same to specific locations as to the windshield surface to prevent the formation of ice thereon and to otherwise maintain improved vision for the vehicle operator. It is not feasible to position the heater in such close proximity to the windshield, for example, that heated air can be discharged directly against the windshield surface and the effectiveness of a given volume of air discharged from the heater is substantially minimized for the purposes intended during transfer to the surface to be heated.

It is therefore an object of the invention to provide a vehicle heating system which is particularly effective in supplying heated air to the passenger compartment and to a specific location, such as a windshield surface, relatively remotely removed from the heater.

More particularly, the invention has for an object the provision in a heating system of the foregoing type of an improved heater which is especially adapted to supply heated air as aforesaid; to provide a heating unit including a fan operable to propel heated air both axially and radially with respect to its axis of rotation, together with improved means whereby air so propelled is directed to the vehicle passenger compartment and to a surface, such as that of a windshield, remotely removed from the heater.

Another object of the invention is the provision in a heater of improved means for effectively directing radially propelled air to a windshield surface and to provide means of this character which will not interfere with the passage of axially propelled air to the passenger compartment and to provide a shroud surrounding a fan of the foregoing type accommodating the passage of axially propelled air therethrough and having a removable section which, in one position, accommodates the passage of radially propelled air therethrough and which, in another position, completes closure of the fan.

Other objects and advantages of the invention will be more apparent from the following description taken in connection with the accompanying drawings, in which:

Fig. 3 is an enlarged transverse sectional view taken on line 3—3 of Fig. 2.

Fig. 4 is a fragmentary elevational view, partly in section, taken as indicated by the line 4—4 of Fig. 3.

Figure 1:
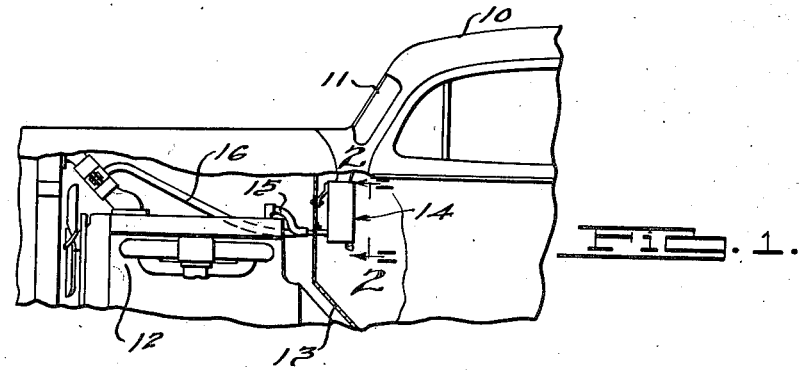
Fig. 1 is a fragmentary side elevational view of a motor vehicle embodying the invention, parts being broken away.
Figure 2:
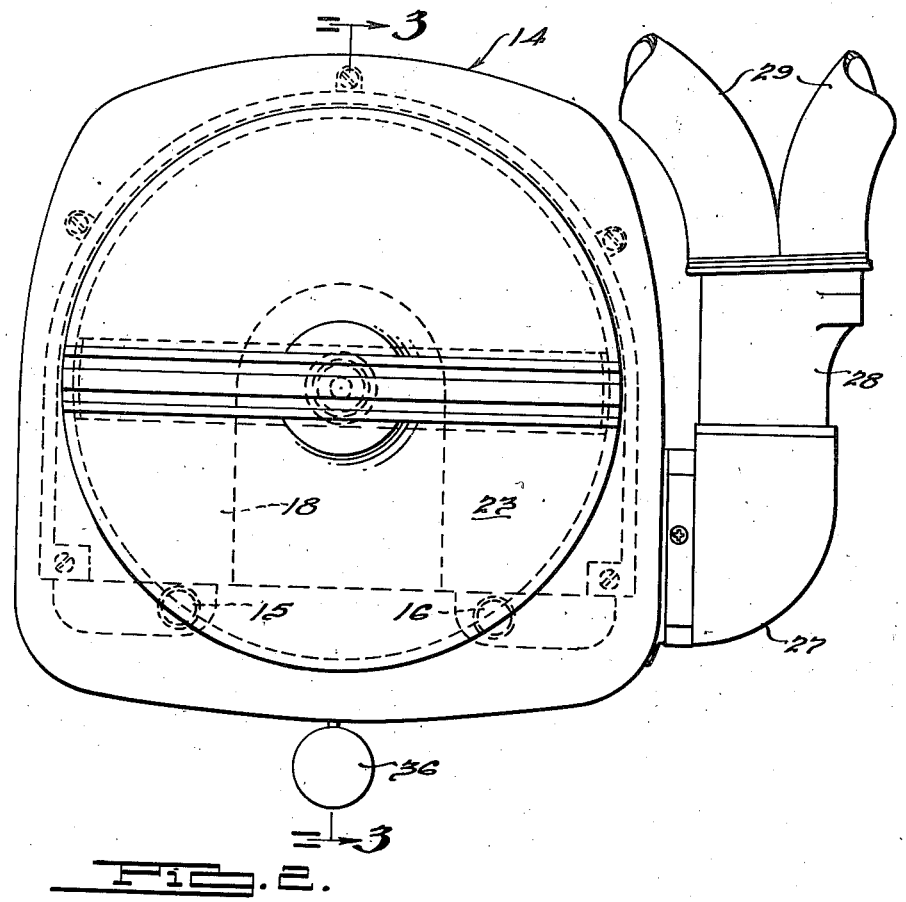
Fig. 2 is a fragmentary elevational view as indicated by the line 2—2 of Fig. 1.

Referring to the drawings, there is shown a motor vehicle including a body 10 providing a passenger compartment and having a windshield glass 11, an internal combustion engine 12 having a water cooling system, the engine and passenger compartments being separated by a dash 13. Supported from the latter, in spaced relation thereto as shown in Fig. 3, is a heater unit, generally designated by the numeral 14, of the hot air type connected with the engine cooling system by the conduits 15 and 16 for circulation of hot water thereto.

The heater unit 14 includes a casing 17 fabricated from a plurality of sheet metal stampings providing a chamber for a suitable core 18 of horse-shoe shape, through which hot water is circulated. The casing 17 includes a side wall 19 extending forwardly of the core chamber and providing a compartment for a fan 20 driven by an electric motor 21, the fan being operable to draw air through the core 18. Air so drawn is heated as it passes through the core and the blades of the fan are so arranged as to propel air thus heated both axially and radially with respect to its axis of rotation.

The wall 19 is reversely bent to provide an arcuate contour at the front of the casing and an annular wall or shroud 22 surrounding the fan 20 and disposed immediately adjacent the radially outer end of the fan blades and in spaced relation to the wall 19. Air propelled axially by the fan 20 passes axially through the shroud 22 and is discharged into the passenger compartment under control of a baffle plate 23 universally adjustable relative to a support 24 projecting diametrically across the fan from the wall 22.

The casing wall 19 has an outer opening 25 therein accommodating the passage of radially propelled air therefrom, the wall adjacent this opening being reinforced by the flanged member 26. The wall is shaped to provide an elbow at 27 opening upwardly and to which is attached a hot air conductor 28 and communicating with the latter is a pair of conduits 29 which conduct heated air to the inner surface of the windshield at laterally spaced locations. A baffle 30 extends between the walls 19 and 22.

In order to accommodate the passage of radially propelled air to the outlet opening 25, the wall 22 is provided with a circumferentially elongated opening 31 intermediate the free edge of the wall 22 and the arcuately contoured portion thereof, the opening 31 registering with the outlet 25. Passage of air through the opening 31 is controlled by a closure 32 therefor secured to a reinforcing and mounting part 33 which is in turn pivotally secured by a pin 34 to a base 35 carried by the wall 19. The closure 32 is movable by a knob 36 secured to the part 33. The closure 32 has flanged opposite edge portions, one of which is shown at 37 in Fig. 4, which frictionally engage the wall bounding the opening 31 to retain the closure in the position illustrated in full lines in Fig. 4, in which position the closure and wall 22 complete closure of the fan 20 and radially propelled air cannot pass to the outlet 25.

When it is desired to supply heated air to the windshield surface as aforesaid, the knob 36 is moved clockwise effecting similar movement of the closure 32, to its open position as illustrated in dotted lines in Fig. 4, in which position the closure directs radially propelled air toward the outlet 25 and thereby facilitates the maintenance of an effective volume of heated air to the windshield surface.

The arrangement not only facilitates the transfer of radially propelled air as aforesaid, but facilitates as well the passage of axially propelled air to the vehicle passenger compartment in that it eliminates the creation of a pocket intermediate the fan and the outlet opening 25 which would otherwise be present should the closure be located in the latter opening, for example. Such pocket would contain a body of air which would interfere with the normal passage or discharge of axially propelled air.

I claim:

1. In a hot air heater, a casing including a wall having an outlet opening a fan in said casing operable to propel air axially and radially with respect to its axis, an annular shroud surrounding said fan disposed radially between the latter and said wall and adapted to accommodate the passage of axially propelled air therethrough, said shroud having a circumferentially elongated opening therein adapted to accommodate the passage of radially propelled air therethrough to said outlet opening, and a closure for said shroud opening supported by said casing for swinging movement on an axis substantially parallel to the axis of rotation of said fan between a first position to accommodate the passage of radially propelled air through said shroud opening to said outlet opening and a second position closing said shroud opening to passage of air therethrough and completing closure of said fan.

2. In a hot air heater, a casing including a wall having an outlet opening a fan in said casing operable to propel air axially and radially with respect to its axis, an annular shroud surrounding said fan disposed radially between the latter and said wall and adapted to accommodate the passage of axially propelled air therethrough, said shroud having a circumferentially elongated opening therein adapted to accommodate the passage of radially propelled air therethrough to said outlet opening, and a closure for said shroud opening supported by said casing for swinging movement on an axis substantially parallel to the axis of rotation of said fan for movement between a first position to accommodate the passage of radially propelled air through said shroud opening to said outlet opening and a second position closing said shroud opening to the passage of air therethrough and completing closure of said fan, said closure having flanged edge portions frictionally engageable with the wall bounding said shroud opening whereby said closure member is maintained in its last mentioned position.

3. In a vehicle heating unit comprising a casing having an open end, a heating core within the casing remote from said open end, a bladed fan within the casing between said open end and said heating core for drawing air through the latter and discharging such air from the casing, a shroud within the casing surrounding said fan and located in close adjacency with respect to the outer extremity of the fan blades, said shroud comprising a fixed body section and a movable section adapted when displaced relative to said fixed body section to accommodate the flow of air from within said shroud into said casing between a wall of the latter and said shroud, a baffle located centrally of the open end of the casing providing a normal heated air outlet between the extremity of the baffle and the casing, said casing wall having an outlet adjacent said movable section adapted to receive air discharged through said shroud when said movable section is displaced as aforesaid, and said outlet having air conducting means communicating therewith and extending to a location remote from the heater proper.

4. In a vehicle heater unit, a casing having an air outlet, a heating core within the casing spaced from said outlet, a fan within the casing between said outlet and said core for drawing air through the latter and discharging such air from the casing, an annular shroud surrounding said fan and providing a confining passage for the air drawn through said core for discharge from said casing, said shroud having an opening therein for accommodating the flow of air from within said shroud into a space between the latter and the adjacent portion of the casing, said casing having an outlet adjacent said shroud opening communicating with said space and a location relatively remote from the heater, and a closure movable between a first position closing said opening and completing said shroud and a second position to accommodate the flow of air from within said shroud into said space.

5. In a vehicle heater unit, a casing having an air outlet, a heating core within the casing spaced from said outlet, a fan within the casing between said outlet and said core for drawing air through the latter and discharging such air from the casing, an annular shroud surrounding said fan and providing a confining passage for the air drawn through said core for discharge from said casing, said shroud having an opening therein for accommodating the flow of air from within said shroud into a space between the latter and the adjacent portion of the casing, said casing having an outlet adjacent said shroud opening communicating with said space and a location relatively remote from the heater, and a closure movable between a first position closing said opening and completing said shroud and a second position within said space to accommodate the flow of air from within said shroud into said space, said closure when in said second position constituting a deflector within said space for directing air to said casing outlet.

6. In a vehicle heater unit, a casing having an air outlet, a heating core within the casing spaced from said outlet, a fan within the casing between said outlet and said core for drawing air through the latter and discharging such air from the casing, an annular shroud surrounding said fan and providing a confining passage for the air drawn through said core for discharge from said casing, said shroud having an opening therein for accommodating the flow of air from within said shroud into a space between the latter and the adjacent portion of the casing, said casing having an outlet adjacent said shroud opening communicating with said space and a location relatively remote from the heater, and a closure movable between a first position closing said opening and completing said shroud and a second position to accommodate the flow of air from within said shroud into said space, and a baffle extending between said casing and shroud positioned adjacent said shroud openings.

7. In a heater unit comprising a casing having an outlet opening for communicating heated air to a location relatively remote from the heater proper, a heater core within said casing, a fan within said casing for drawing air through said core and discharging such air from the casing, said casing including an outer wall having a return bent portion defining an air outlet end generally centrally with respect to the casing and providing an annular shroud within said casing surrounding said fan spaced from said outer wall, said shroud having an opening therein accommodating the passage of air from within said shroud into a space between the latter and said casing adjacent the casing outlet opening, at least a portion of the air so passing into said space being discharged therefrom through said outlet opening for communication to said location, and a closure controlling the passage of air through said shroud opening movable between a first position closing said opening to the passage of air therethrough and a second position accommodating passage of air through said opening as aforesaid.

8. In a heater unit comprising a casing having an outlet opening for communicating heated air to a location relatively remote from the heater proper, a heater core within said casing, a fan within said casing for drawing air through said core and discharging such air from the casing, said casing including an outer wall having a return bent portion defining an air outlet end generally centrally with respect to the casing and providing an annular shroud within said casing surrounding said fan spaced from said outer wall, said shroud having an opening therein accommodating the passage of air from within said shroud into a space between the latter and said casing adjacent the casing outlet opening, at least a portion of the air so passing into said space being discharged therefrom through said outlet opening for communication to said location, a closure controlling the passage of air through said shroud opening movable between a first position closing said opening to the passage of air therethrough and a second position accommodating passage of air through said opening as aforesaid, and a baffle located centrally of said casing air outlet end providing a heated air outlet between the extremity of the baffle and the casing return bent portion.

JENS WILLIAM DUHN.